United States Patent [19]

Schlatter et al.

[11] 4,071,600
[45] Jan. 31, 1978

[54] PROCESS FOR IMPROVED 3-WAY EMISSION CONTROL

[75] Inventors: James C. Schlatter, Troy; Kathleen C. Taylor, Birmingham, both of Mich.

[73] Assignee: General Motors Corporation, Detroit, Mich.

[21] Appl. No.: 747,806

[22] Filed: Dec. 6, 1976

[51] Int. Cl.² .............................................. B01D 53/34
[52] U.S. Cl. ................................... 423/213.7; 423/288
[58] Field of Search ........................... 423/213.5, 213.7

[56] References Cited

U.S. PATENT DOCUMENTS

| | | | |
|---|---|---|---|
| 3,370,914 | 2/1968 | Gross | 423/213.5 |
| 3,801,667 | 4/1974 | Kobyliwski | 423/213.7 |
| 3,914,376 | 10/1975 | Barker | 423/213.5 |
| 3,929,965 | 12/1975 | Kim et al. | 423/213.5 |

FOREIGN PATENT DOCUMENTS 1,431,377  7/1976  United Kingdom.

*Primary Examiner*—G. O. Peters
*Attorney, Agent, or Firm*—Sidney Carter

[57] ABSTRACT

A process for improved three-way emissions control comprising the steps of contacting the emissions stream with a first catalyst consisting of rhodium supported on a refractory substrate to effect the selective chemical reduction of nitric oxide to nitrogen, said rhodium being present in an amount of at least about 0.002% by weight of the catalyst, said emissions stream being then contacted with a second catalyst consisting of at least one of the noble metals selected from the group of platinum and palladium, said noble metal being present in a small but effective amount to accomplish the oxidation of the hydrocarbons and carbon monoxide left in said emissions stream, said process being accomplished without the addition of oxygen to said emissions stream.

4 Claims, 11 Drawing Figures

NH₃ FORMATION AND NO APPEARANCE OVER FRESH Rh CATALYSTS AT TWO LOADINGS.

OXIDATION ACTIVITY AT VARIOUS Rh LOADINGS

OXIDATION ACTIVITY OF VARIOUS METAL COMBINATIONS. ALL SAMPLES AGED 24 HRS. AT 900°C IN AIR.

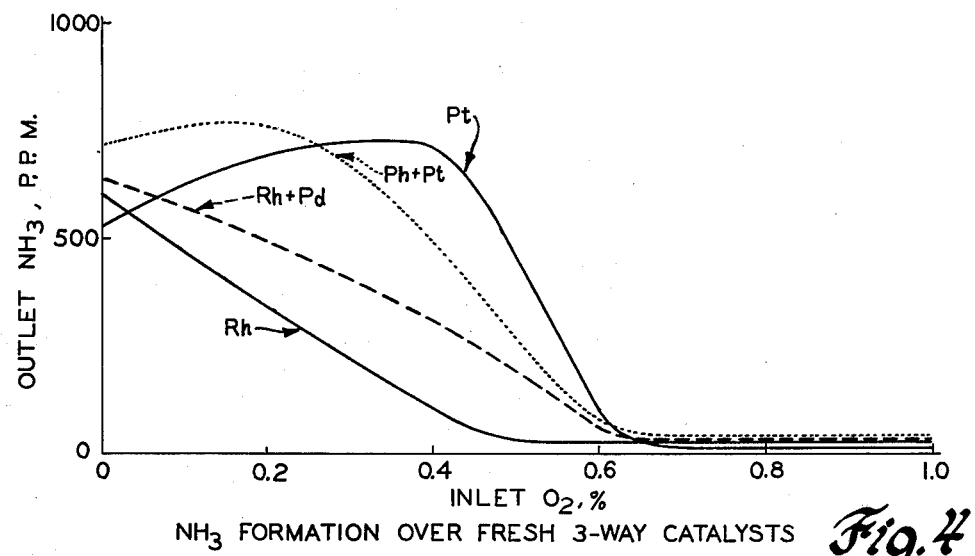
NH₃ FORMATION OVER FRESH 3-WAY CATALYSTS  *Fig. 4*
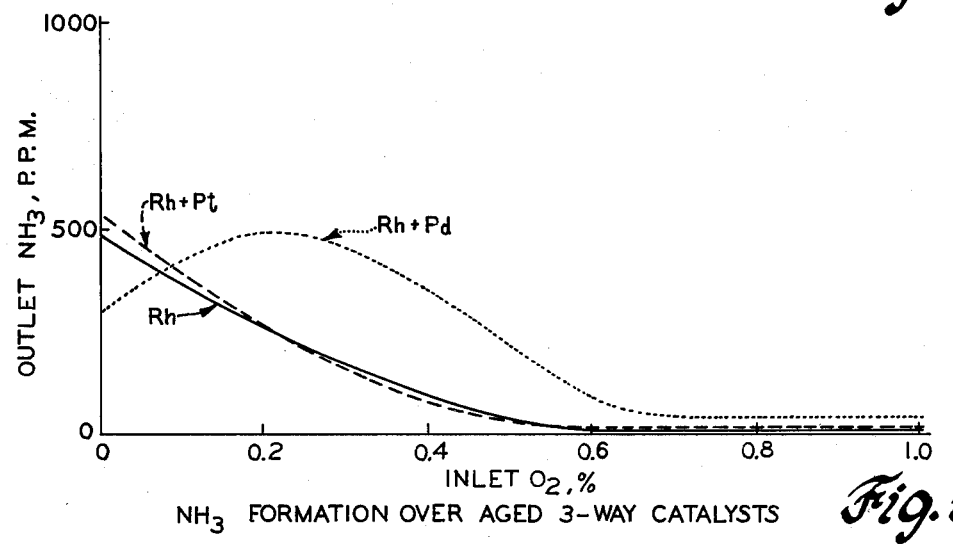
NH₃ FORMATION OVER AGED 3-WAY CATALYSTS  *Fig. 5*
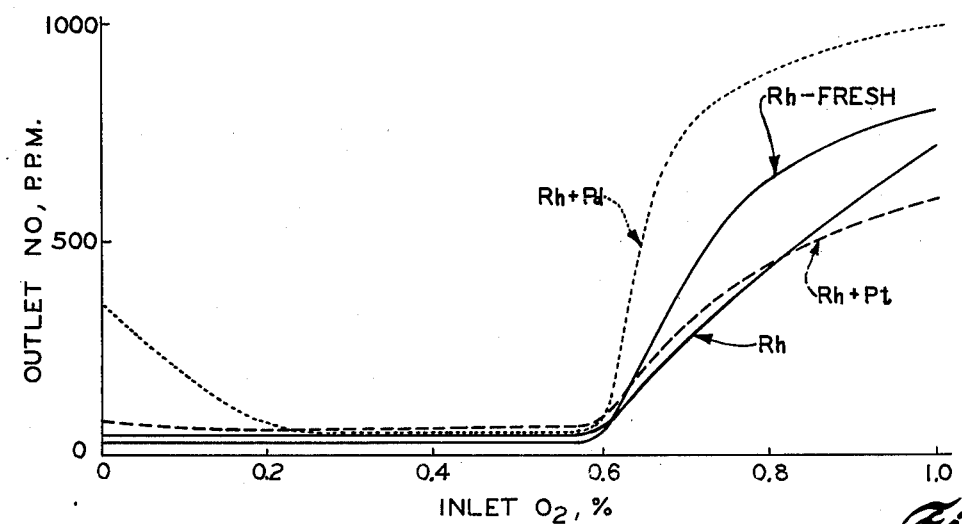
EFFECT OF ADDED METALS ON LEAN-SIDE NO. CONTROL
(THERMALLY AGED CATALYSTS EXCEPT AS NOTED)  *Fig. 6*

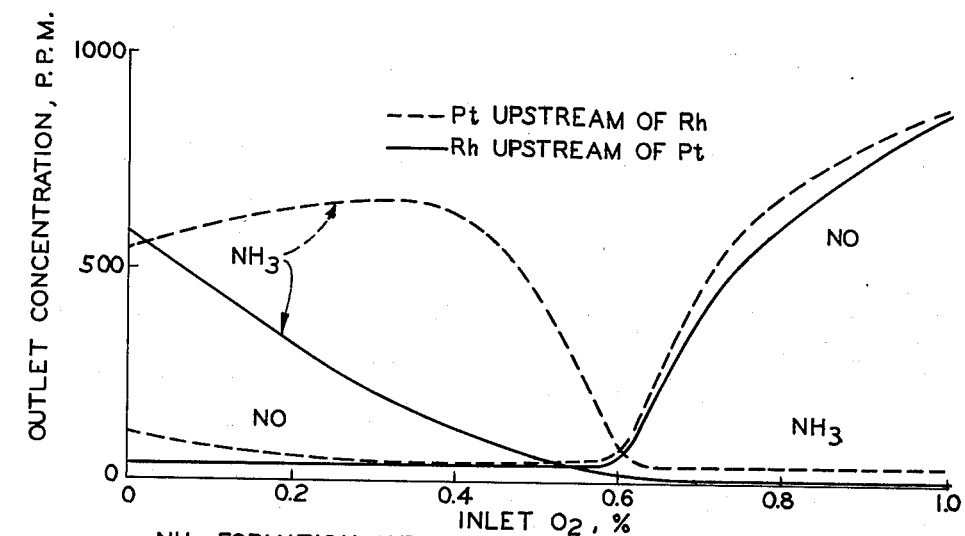
Fig. 7 NH₃ FORMATION AND NO APPEARANCE WHEN METALS ARE SEPARATED IN THE CATALYST BED (FRESH CATALYSTS)
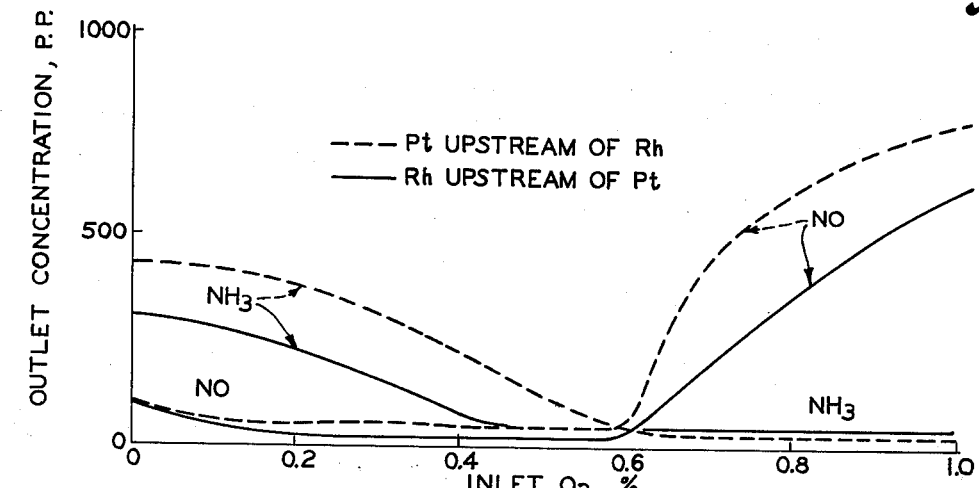
Fig. 8 NH₃ FORMATION AND NO APPEARANCE WHEN METALS ARE SEPARATED IN THE CATALYST BED (CATALYSTS AGED 24 HRS. AT 900°C)
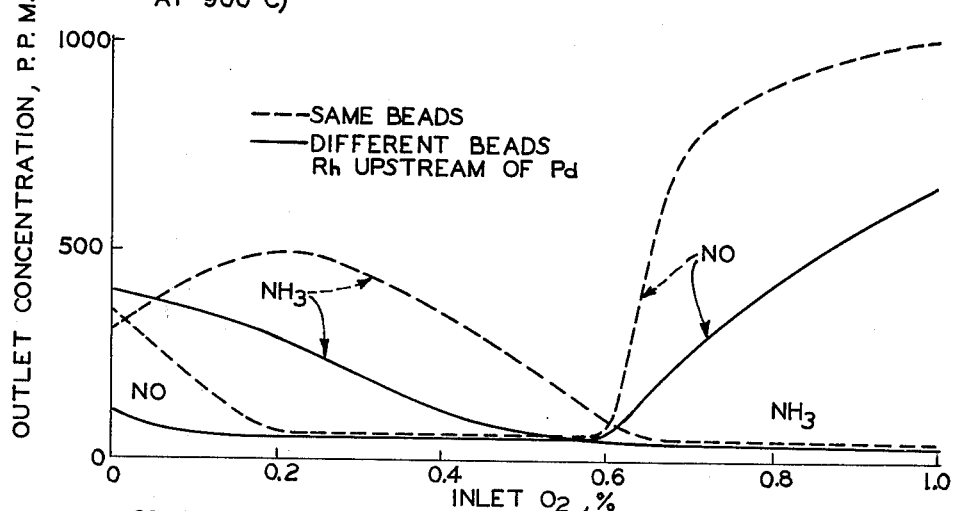
Fig. 9 COMPARISON OF Rh AND Pd ON SEPARATE BEADS VS. BOTH METALS ON SAME BEADS. (THERMALLY AGED CATALYST)

OXIDATION PERFORMANCES OF TWO-METAL SYSTEMS ON SEPARATE PELLETS. ALL SAMPLES AGED 24 HRS. AT 900° C IN AIR.

COMBINED VS. SEPARATED RHODIUM AND PALLADIUM CATALYSTS FOR NITRIC OXIDE REMOVAL

PROCESS FOR IMPROVED 3-WAY EMISSION CONTROL

BACKGROUND OF THE INVENTION

The simultaneous elimination of the three major automotive pollutants ("3-way control") entails both chemically reducing reactions (for nitric oxide) and chemically oxidizing reactions (for carbon monoxide and hydrocarbons) in passage of the emissions stream over a single dual function catalyst, see U.S. Pats. Nos. 3,951,860, dated Apr. 20, 1976 and 3,898,181 dated Aug. 5, 1975. Alumina-supported catalysts containing rhodium in combination with other precious metals (typically platinum and/or palladium) have been commercially used as 3-way catalysts. Rhodium is effective for catalyzing the reduction reactions, while the other metals act to increase and stabilize the oxidation activity.

Our laboratory studies of fresh and thermally aged samples have shown that adding platinum and/or palladium to an alumina-supported rhodium catalyst, while increasing oxidation activity, causes more ammonia formation in rich mixtures and poorer over-all nitric oxide control in lean mixtures than is achieved over rhodium alone. This results from the fact that Pt and/or Pd, unlike Rh, act on NO to form primarily $NH_3$ rather than $N_2$ under reducing conditions. Under oxidizing conditions, though both NO and $O_2$ are oxidizing agents for the CO and HC, the $O_2$ most often reacts preferentially as the oxidizer and thus leaves the NO to pass through unreacted. This is especially true when Pt and/or Pd is present to catalyze reactions with $O_2$. Further, though rhodium compares favorably with platinum and palladium as an oxidation catalyst, total availability of rhodium and its low relative content in the ore as mined imposes practical limits on the loading on the support, and low loading of rhodium limits its oxidation performance.

In order to use 3-way catalysts, the art has developed a control system which is to operate the engine with the stoichiometrically correct air-fuel ratio to provide exhaust with just the proper balance of oxidizing agents ($O_2$, NO) and reducing agents (CO, HC, $H_2$). An ideal catalyst then could catalyze reactions to the entire mixture and lower all three pollutants simultaneously, see U.S. Pat. No. 3,696,618, dated Oct. 10, 1972. Though this system has the advantage of using a single catalyst bed, and stoichiometric engine operation gives better fuel economy than the rich operation required for the dual-bed approach, it does, however, require a precise feedback-controlled fuel metering system governed in part by an oxygen sensor in the exhaust stream. The continual sensing and readjustment of the air-fuel ratio causes the exhaust to fluctuate about the stoichiometric composition. This places additional demands upon the 3-way catalyst in that it must maintain its effectiveness on both the rich and lean sides of the stoichiometric point and is subject to the limitations in conversion noted above.

An alternative system disclosed by the art, see U.S. Pat. No. 3,953,576, dated Apr. 27, 1976, is to operate the engine fuel-rich to provide an oxygen-deficient (reducing) exhaust in which nitric oxide reduction (by CO, HC, and $H_2$) can be catalyzed. Then air is pumped into the exhaust as it passes into a second catalyst bed for oxidizing the remaining CO and HC. This is obviously an expensive design and adds additional weight to the vehicle by reason of the additional pump and auxiliary control equipment required.

THE INVENTION

Based on extensive laboratory testing, we have developed a system for improved 3-way emissions control which eliminates the problems described above while giving improved NO control. The system of our invention is one in which a rhodium catalyst having a loading as low as about 0.002% by weight is placed first (upstream) in the exhaust stream to convert the nitric oxide to nitrogen. Then the gases pass downstream of the rhodium through a platinum and/or palladium catalyst to convert carbon monoxide and hydrocarbons to carbon dioxide and water. Because much of the nitric oxide is eliminated over the rhodium catalyst, there is lessened potential for ammonia formation in the platinum/palladium section of the reactor. Also, since the reactions over platinum/palladium consume exhaust components useful in the ntric oxide reduction over rhodium, placement of these catalytic materials downstream of the rhodium assures improved nitric oxide control.

It was also found that the thermal aging of the catalysts described, pre-treatment by heating in air for about 24 hours at about 900° C, produces (in rich mixtures) decreased $NH_3$ formation and NO concentration (in lean mixtures) as compared to results with fresh catalyst. This is particularly important as to a rhodium catalyst operating in an emmissions stream on the lean side of the stoichiometric $O_2$ concentration since thermal aging for $Rh/Al_2O_3$ catalyst greatly improved lean-side NO control.

The described two bed rhodium and platinum system of our invention is clearly distinguished from the so-called dual-bed approach in which a reducing catalyst is placed first in the exhuast stream followed by an oxidizing catalyst, air injection being required between the two catalysts to provide an oxidizing atmosphere. Also, our invention contemplates operation near or substantially at the stoichiometrically correct engine air-fuel ratio rather than on the rich side of stoichiometric, thus improving the fuel economy and obviating the need for air injection.

It is therefore an object of our invention to provide an improved emissions control process in which separate reduction and oxidation beds are situated in the emissions stream, contact being first made with the reducing bed and addition of oxygen being omitted.

It is a further object of our invention to provide a process for control of undesirable constituents in an emissions stream wherein the stream is first contacted with a catalyst consisting essentially of rhodium in an amount as low as 0.002% by weight for reduction of nitric oxide followed by contact with an oxidizing catalyst without addition of oxygen to the stream for achieving oxidation.

It is a further object of our invention to further improve catalytic control of an emissions stream by the use of catalyst which has been thermally aged by heating in air for about 24 hours at a temperature of about 900° C.

These and other objects of our invention are achieved as demonstrated in the description which follows and as pictured in the drawings in which FIG. 1 shows $NH_3$ formation and NO concentration over fresh rhodium catalyst at two loadings;

FIG. 4 shows the extent of ammonia formation over various fresh two-metal and single metal catalysts;

FIG. 5 shows the extent of ammonia formation over various aged two-metal and single metal catalysts;

FIG. 6 shows the effect of added metals and rhodium on NO control, lean mixtures;

FIG. 7 shows ammonia formation and NO presence with separated beds of fresh rhodium and platinum in interchanged upstream positions in the gas stream;

FIG. 8 shows the data for tests similar to those shown in FIG. 7 except using aged catalyst;

FIG. 9 shows a comparison of aged rhodium and palladium in separated beds and on the same pellets;

In conducting our experiments, pellets impregnated as described hereinafter were positioned in the text reactor, a stainless steel pipe of 19 mm. I.D.. Three-way performance, both where separate beds for rhodium and for oxidizing catalyst were used and where the rhodium and oxidizing catalyst materials were combined as by codeposition and used in a single bed, was tested using a stabilized sample at a temperature of 538° C.

Stabilization was achieved by using a feed stream blended to simulate the typical mole percentages in automotive exhaust without $O_2$, i.e., approximately, 1% CO, 0.3% $H_2$, 0.1% NO, 10% $CO_2$, 10% $H_2O$ and the balance $N_2$. The feed stream was passed through 15 $cm^3$ of the sample at 38,000 $h^{-1}$ space velocity or about 9.4 liters/min. (measured at room temperature and pressure). The sample was heated in this stream to 650° C in about 1 hour and was held at this temperature for about 1 hour, the test being conducted after cooling to 538° C. For each inlet oxygen level the outlet stream composition was determined after all the analyzers indicated no further changes in conversion were occurring.

Different inlet $O_2$ levels covered the region from "rich" to "lean" operation; the stoichiometric $O_2$ concentration for the described standard feed was 0.6%. A change of 0.1% in exhaust $O_2$ concentration corresponds to approximately 0.08 air/fuel ratio unit. Results of our 3-way catalyst evaluations are reported as reactor outlet concentrations versus inlet $O_2$ concentration.

The reactor was loaded with the catalyst resting on 5 $cm^3$ of silicon carbide and covered with an additional 35 $cm^3$ of silicon carbide to serve as a preheating and mixing section for the reactants. For experiments with the two separate beds of our invention, 7 ½$cm^3$ of one catalyst was poured into the reactor and then was covered with 3 $cm^3$ of silicon carbide as a separating screen followed by 7 ½$cm^3$ of the second (upstream) catalyst. Thermocouples were located above, below, and within the catalyst bed.

Figure 2:
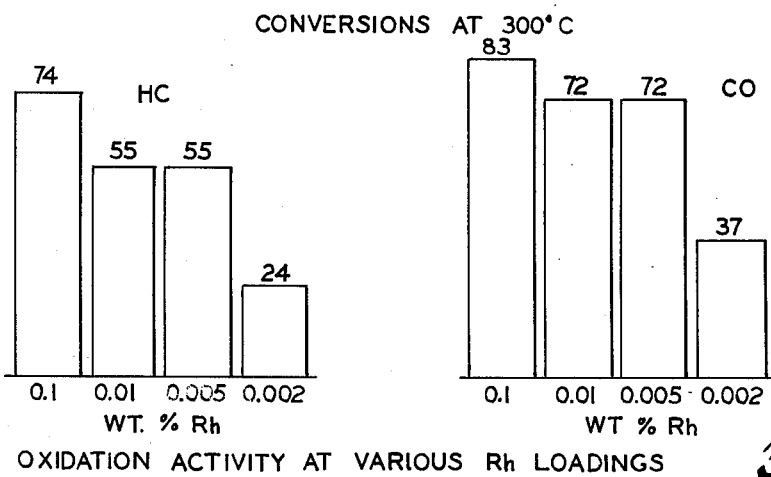
FIG. 2 shows oxidation activity at various fresh rhodium loadings.
Figure 3:
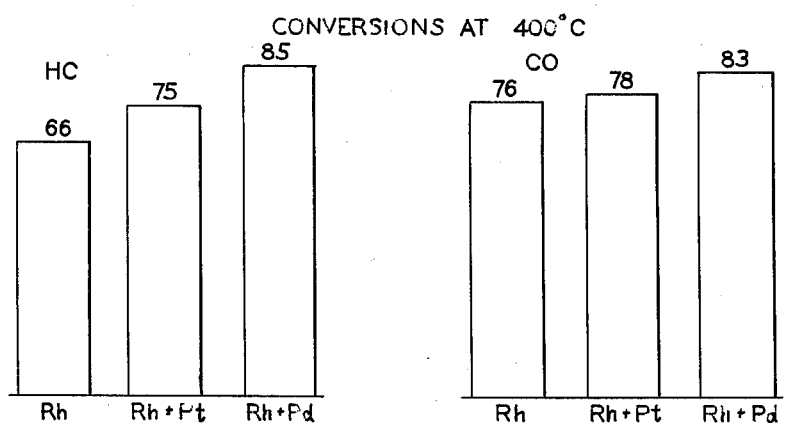
FIG. 3 shows oxidation activity for rhodium and two-metal catalysts of rhodium with palladium and platinum, all aged.

Oxidizing capabilities of the catalysts as shown in FIGS. 2 and 3 were measured at steadily increasing temperatures with a feed stream having excess oxygen, i.e., 2% CO, 0.05% propylene, 2% $O_2$, 10% $CO_2$, and 10% $H_2O$, the balance nitrogen. It was passed through 10 $cm^3$ of catalyst at a space velocity of 85,000 $h^{-1}$ or about 14.2 liters/min. (room T and P) as the temperature was increased from ambient to about 650° C in about 45 min. Oxidation of CO and propylene to $CO_2$ and $H_2O$ was monitored as a function of the catalyst temperature. To assure that the samples were comparable to those used in the 3-way evaluations, they were heated for about 2 hours at 650° C in the same feed stream as used to stabilize the 3-way samples. In the oxidation experiments shown in FIG. 10, it was important to use the same catalyst bed in both the 3-way and oxidation evaluations. Accordingly, the catalyst volume was 15 $cm^3$ for both tests and the oxidation feed stream was 0.3% CO, 0.025% propylene, 1.5% $O_2$, 10% $CO_2$, and 10% $H_2O$ in a nitrogen background flowing at a space velocity of 57,000 $h^{-1}$, this more closely simulating the steady state exhaust composition, in mole percent, of current automotive engines.

All catalysts were prepared by impregnating alumina spheres (Kaiser low-density $Al_2O_3$, 3 mm. diam., bulk density about 0.55 g/$cm^3$) to incipient wetness with a solution of the appropriate metal chlorides (using as start materials $RhCl_3 \cdot 4H_2O$, 5% solution $PdCl_2$; 10% solution $H_2PtCl_6 \cdot 6H_2O$). After drying overnight at ambient temperature the beads were heated in flowing air for 4 hours at 100° C and then 4 hours at 500° C. The thermal aging treatments were carried out by placing the sample for 24 hours in a muffle furnace previously heated to 900° C.

As noted above, a 3-way catalyst must promote both NO removal (by reaction with CO, HC, or $H_2$) and CO and HC removal (by reaction with $O_2$, NO, or $H_2O$). In the case of precious metal catalysts, availability of the active component imposes an additional constraint. Rhodium, for example, is about 20 times less plentiful than platinum in the mines of South Africa. Practical necessity therefore dictates lowering metal loadings to the fullest extent compatible with acceptable performance.

Figure 1:
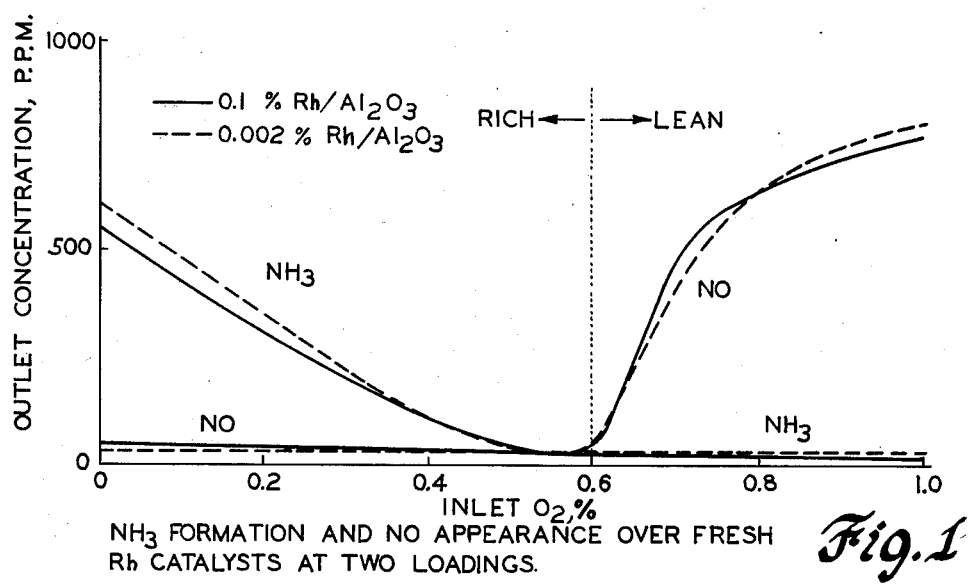

To determine the sensitivity of performance to metal loading, fresh $Rh/Al_2O_3$ catalysts at two loadings, 0.1 and 0.002 weight % were tested, the results being shown in FIG. 1 and Table I which also lists the data for the remaining reduction tests shown in the drawings. The curves are typical of Rh; $NH_3$ is formed as a product of NO reduction at the lowest $O_2$ levels and disappears as $O_2$ is added. Once the stoichiometric $O_2$ concentration (0.6% is exceeded, the NO is no longer completely reduced over the catalyst. Surprisingly, a fiftyfold decrease in Rh loading showed little effect on NO removal efficiency and $NH_3$ formation.

Various Rh loadings were also examined for oxidation performance, the second criterion described above for a 3-way catalyst. The results are shown in FIG. 2 for fresh catalyst as percentage conversions of the reactant stream at 300° C. In contrast to the reduction of NO, there is a marked loss in oxidation efficiency in going to the low metal loadings of practical interest, i.e., 0.005 and 0.002 weight %. It should be noted, however, that rhodium is not inherently a poor oxidation catalyst, its activity comparing favorably with platinum and palladium. The drawback with rhodium is simply that availability limits the loading, and the low loading limits oxidation performance.

In order to improve the oxidation performance of the rhodium catalyst, platinum and palladium were added to the rhodium to form a combined 3-way catalyst. Such two-metal samples were prepared with loadings chosen to approximate the natural abundance ratios, that is, 0.05 weight % Pt, 0.02 weight % Pd, and 0.002 weight % Rh. The oxidation evaluation was done on thermally aged samples because the high activity of fresh catalysts makes them nearly indistinguishable in standard oxidation test used and because the thermal treatment is a conveniently reproducible laboratory procedure for aging samples. FIG. 3 shows that indeed Pt or Pd combined with Rh on a support enhances the conversion of HC and CO in the oxidation test. The enhancement is greater for Pd than Pt and reflects the greater thermal stability of Pd in the oxidizing atmosphere used for aging.

These same two-metal catalysts were also evaluated to determine effects on $NH_3$ formation. Earlier experiments had shown that either Pt or Pd alone forms significant quantities of $NH_3$ on the rich side of the stoichiometric point as shown in FIG. 4 for a Pt catalyst at the 0.05 weight % loading. This ammonia forming property of Pt and Pd catalysts, if carried over to the Pt+Rh and Pd+Rh combinations, would be an undesirable feature of the two-metal approach.

$NH_3$ formation over the combined catalysts in the laboratory 3-way test is shown in FIG. 4 along with the $NH_3$ formed over Rh alone. The two-metal 3-way catalysts produce considerably more $NH_3$ than Rh alone, and the $NH_3$ persists in significant amounts over the entire range of rich operation ($<0.6\%$ $O_2$). It should be noted that Rh alone offers a range of 0.1% $O_2$ on the rich side of stoichiometric with substantially no $NH_3$ formation, this being very desirable in closed loop air-fuel ratio controlled systems. It is interesting that the Rh+Pt catalyst, combined catalyst, does not form as much $NH_3$ as the Pt by itself. Since Rh by itself catalyzes $NH_3$ removal, it is possible with the two-metal catalyst that the Pt makes $NH_3$ (at its usual rate) while Rh decomposes it. The fact that more $NH_3$ is produced over Rh+Pt than over Rh alone could mean that the formation reaction over Pt is faster than the decomposition over Rh.

We have found that catalyst aging or pretreatment in air for 24 hours at 900° C causes interesting changes in the ammonia generation curves of the various catalysts. FIG. 5 shows that in each case the $NH_3$ formation is decreased relative to the fresh catalyst results shown in FIG. 4. The most striking feature of FIG. 5 is the coincidence of the "Rh + Pt", combined on the same pellet, and the "Rh" lines. The implication is that the platinum has sintered to the extent that it is no longer effective in the reducing reactions, the $NH_3$ curve being governed solely by the Rh characteristics. Alloying cannot be ruled out, however, because the aging treatment might have caused surface rearrangements to yield rhodium-like catalytic behavior. Palladium, because it does not sinter as readily as platinum, retains appreciable activity for $NH_3$ formation even after thermal aging.

As noted above, a 3-way catalyst must be effective in removing CO, HC, and NO at lean as well as rich air-fuel ratios. The difficult species to control on the lean side ($>0.6\%$ $O_2$ in our experiments) is NO, as depicted in FIG. 6. As shown with the fresh Rh catalyst the NO reappears rapidly once the inlet $O_2$ level exceeds the stoichiometric amount. The unexpected observation with the $Rh/Al_2O_3$ catalyst was that the thermal aging actually improved lean-side NO control; that is, the concentration of NO at the reactor outlet as the inlet $O_2$ concentration increased was lowered considerably relative to the fresh catalyst. The NO curves for the thermally aged Rh+Pt and Rh+Pd catalysts, FIG. 6, show marked differences among the samples, with Rh+Pd losing NO control quickly in the presence of only a slight excess of $O_2$. As in the case of $NH_3$ formation, the aged Rh+Pt sample is essentially equivalent to the Rh alone.

The data just presented, when combined with the measurements of oxidation activity shown earlier, provide a key to understanding the connection between some of the various reactions which occur in three-way catalysts. Carbon monoxide, because it can react with either NO or $O_2$, plays a pivotal role in determining the efficiency of NO removal. An effective three-way catalyst must promote the CO-NO reaction in the presence of $O_2$, and this criterion has made rhodium a common choice for three-way control. However, the addition of Pt or Pd to promote the oxidation reactions (e.g., CO-$O_2$) upsets the overall selectivity for NO removal.

There is apparently a delicate balance which determines the amount of NO consumed by the reducing agents (CO,$H_2$). Since oxygen reacts readily with the CO and $H_2$, it tends to regulate the quantity of these reactants available for NO reduction. On the rich side of the stoichiometric point the reducing agents are in excess; so both NO and $O_2$ are removed completely. On the lean side, however, the reducing agents become the limiting reactants; and the split of these agents between NO and $O_2$ determines the effectiveness of NO control under lean conditions. The results in FIG. 6 indicate that the catalysts with higher oxidation activities, as measured in our oxidation test, are less efficient for converting NO on the lean side, presumably because they catalyze CO and $H_2$ oxidation by $O_2$ at the expense of NO reduction reactions. Thus the split of the reducing agents between NO and $O_2$ is influenced by the oxidation activity of the catalyst.

As described, adding Pt or Pd to Rh has advantages and disadvantages; the oxidation activity is certainly improved, but control of $NH_3$ and lean-side NO is sacrificed. By our experiments, we have found that we can arrange the conditions to maximize the advantages and minimize the disadvantages of these two-metal systems.

Rhodium's primary function is to selectively reduce NO to $N_2$ by reaction with CO, $H_2$, or HC. This is enhanced by high concentrations of the reducing agents.

Platinum's (or palladium's) role is to eliminate the reducing agents (CO, $H_2$, HC) by reacting them with oxygen. This is in conflict with the role of Rh given just above. An undesirable characteristic of Pt and Pd is $NH_3$ formation, a process aided by high NO and reducing agent concentrations.

By our invention, we optimize reactor conditions by separating the catalyst metal into separate beds so that the rhodium-catalyzed reactions are done under the reactor inlet conditions, where reducing agent concentrations are highest. Platinum and palladium are positioned downstream of the rhodium at the reactor outlet where lowered concentrations of reactants minimize the potential for $NH_3$ formation. Thus, the oxidation reactions over Pt and Pd cannot consume the reducing agents before they have had a chance to react over the Rh catalyst.

The effectiveness of separating the metals in different support beds in the emissions stream is shown in FIG. 7 for Rh and Pt. The total catalyst volume, fresh, is 15 $cm^3$ as before, comprising 7.5 $cm^3$ each of 0.005 weight % $Rh/Al_2O_3$ and 0.1 weight % $Pt/Al_2O_3$. Thus, the total metal content of the reactor is the same as used for the combined catalysts discussed above. To be sure of observing only the effects of catalyst bed geometry, we compared the Rh upstream-Pt downstream combination with the same catalysts in the inverted configuration. For the reasons discussed above, the $NH_3$ formation is lowered considerably when Pt is placed downstream of the Rh rather than at the reactor inlet where high NO concentrations prevail.

As described above, thermal aging virtually eliminated the effects of Pt addition on the $NH_3$ formation and NO removal characteristics of a Rh catalyst (FIGS. 5 and 6). That is not the case for the separated metals. FIG. 8 shows that even after aging there is a significant effect of bed geometry, indicting that the platinum still retains at least a small amount of activity under these conditions.

Perhaps the most striking evidence of the benefits of separating the metals is seen in experiments using rhodium and palladium. As shown above, FIGS. 5 and 6, even after thermal aging, a coimpregnated Rh-Pd catalyst made significant amounts of $NH_3$ under rich conditions and quickly lost NO control under lean conditions. A considerably different result was obtained when the Pd and Rh were supported on different beads and separated in the gas stream such that the Rh catalyst was placed upstream of the Pd catalyst. The performance of both the coimpregnated Rh-Pd catalyst and the separated metals ($Rh/Al_2O_3$ upstream of $Pd/Al_2O_3$) is depicted in FIG. 9. The curves for the separated bed (solid lines) are practically identical to those for aged Rh alone (FIGS. 5 and 6), showing that the drawbacks of adding Pt and Pd to a three-way control system may be minimized by careful attention to the catalyst configuration or placement in the gas stream.

Figure 10:
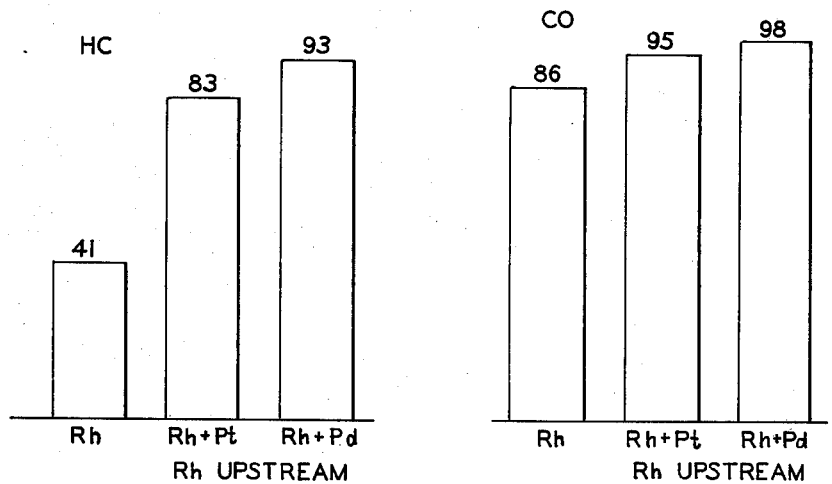
FIG. 10 shows oxidation performance of rhodium, rhodium and platinum, and rhodium and palladium in separated beds, all aged.

Having reduced the major drawbacks of Pt and Pd addition, $NH_3$ formation and NO control, it was necessary to confirm that the oxidation improvement had not been eliminated. Each oxidation evaluation was carried out using the same catalyst bed as used for the 3-way evaluation; thus the volume was 15 $cm^3$ rather than the 10 $cm^3$ typically used in the standard oxidation test. At the same time, the oxidizing feedstream was changed to more nearly simulate the steady-state exhaust composition of current engines (0.3% CO, 0.025% propylene, 1.5% $O_2$, 10% $CO_2$, 10% $H_2O$ in $N_2$). The two-metal systems had the Rh catalyst upstream of the Pt or Pd catalyst, as dictated by the 3-way evaluations just discussed. The results for the separated beds and for Rh alone, all thermally aged, are shown in FIG. 10. Clearly the oxidation activity is improved with the separated catalysts, particularly for HC oxidation.

Figure 11:
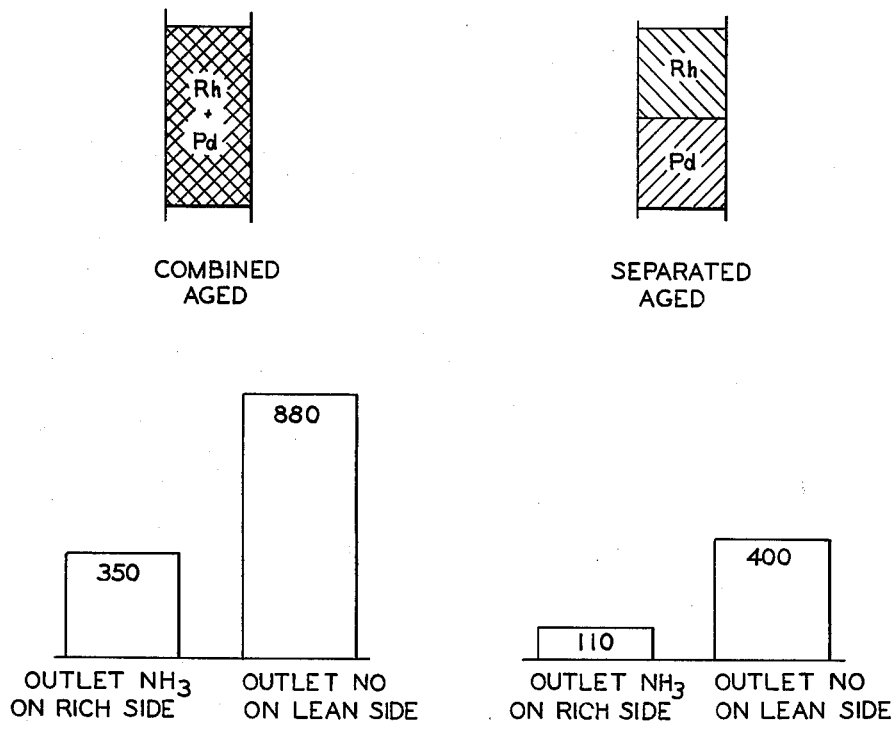
FIG. 11 shows ammonia formation and NO presence for combined and separated rhodium and palladium catalysts, aged.

The dramatic improvement in nitric oxide control by our invention, using rhodium in amounts as low as 0.002% by weight on a refractory support positioned upstream of a platinum and/or palladium oxidizing catalyst and without any addition of oxygen to the emissions stream, is also shown in FIG. 11 which represents the data using aged catalyst to show $NH_3$ formation on the rich side of stoichiometric (0.4% $O_2$ at the inlet in FIGS. 5 and 9 for combined catalyst and for separated catalysts, respectively) and NO presence on the lean side of stoichiometric (0.8% $O_2$ at the inlet in FIGS. 6 and 9). It is clear that our invention achieves better than a 69% reduction of $NH_3$ on the rich side and better than a 54% improvement in NO removal on the lean side.

Table I lists the results of our tests and is referenced to the FIGURES of the drawings for ease in comprehension of work.

Table I

DATA FOR TESTS SHOWN IN DRAWINGS

| FIG. | Catalyst | Component (ppm) | 0 | 0.2 | 0.4 | 0.6 | 0.7 | 0.8 | 1.0 |
|---|---|---|---|---|---|---|---|---|---|
| 1 | 0.1% Rh, fresh | NO | 40 | 40 | 40 | 20 | 480 | — | 780 |
|  |  | $NH_3$ | 550 | 330 | 100 | 0 | 0 | — | 0 |
|  | 0.002% Rh, fresh | NO | 40 | 40 | 40 | 30 | 430 | 650 | 800 |
|  |  | $NH_3$ | 610 | 350 | 100 | 30 | 20 | 20 | 20 |
| 4 | 0.05% Pt, fresh | $NH_3$ | 510 | 680 | 710 | 60 | 20 | 20 | 20 |
|  | 0.05% Pt, 0.002% Rh, fresh | $NH_3$ | 730 | 770 | 500 | 80 | 40 | 40 | 40 |
|  | 0.02% Pd, 0.002% Rh, fresh | $NH_3$ | 640 | 500 | 310 | 50 | 30 | 30 | 30 |
|  | 0.002% Rh, fresh | $NH_3$ | 610 | 350 | 100 | 30 | 20 | 20 | 20 |
| 5 | 0.05% Pt, 0.002% Rh, aged | $NH_3$ | 540 | 250 | 80 | 10 | 10 | 10 | 10 |
|  | 0.02% Pd, 0.002% Rh, aged | $NH_3$ | 300 | 500 | 350 | 70 | 50 | 50 | 50 |
|  | 0.002% Rh, aged | $NH_3$ | 500 | 250 | 90 | 30 | 10 | 10 | 10 |
| 6 | 0.002% Rh, fresh | NO | 40 | 40 | 40 | 30 | 430 | 650 | 800 |
|  | 0.002% Rh, aged | NO | 50 | 50 | 50 | 50 | 250 | 420 | 700 |
|  | 0.002% Rh, aged | NO | 50 | 50 | 50 | 50 | 250 | 420 | 700 |
|  | 0.05% Pt, 0.002% Rh, aged | NO | 70 | 60 | 60 | 50 | 300 | 430 | 600 |
|  | 0.02% Pd, 0.002% Rh, aged | NO | 350 | 50 | 50 | 50 | 750 | 880 | 990 |
| 7 | 0.1% Pt upstream from 0.005% Rh, fresh | NO | 100 | 50 | 50 | 50 | 490 | 680 | 900 |
|  |  | $NH_3$ | 550 | 630 | 640 | 60 | 40 | 40 | 40 |
|  | 0.005% Rh upstream from 0.1% Pt, fresh | NO | 50 | 50 | 40 | 50 | 420 | 620 | 890 |
|  |  | $NH_3$ | 580 | 310 | 110 | 20 | 10 | 10 | 10 |
| 8 | 0.1% Pt upstream from 0.005% Rh, aged | NO | 100 | 60 | 50 | 50 | 450 | 600 | 790 |
|  |  | $NH_3$ | 430 | 380 | 210 | 50 | 30 | 30 | 30 |
|  | 0.005% Rh upstream from 0.1% Pt, aged | NO | 100 | 30 | 30 | 30 | 200 | 350 | 620 |
|  |  | $NH_3$ | 310 | 240 | 70 | 50 | 40 | 40 | 40 |
| 9 | 0.02% Pd, 0.002% Rh, aged | NO | 350 | 50 | 50 | 50 | 750 | 880 | 990 |
|  |  | $NH_3$ | 300 | 500 | 350 | 70 | 50 | 50 | 50 |
|  | 0.005% Rh upstream from 0.05% Pd, aged | NO | 110 | 60 | 60 | 60 | 250 | 400 | 640 |
|  |  | $NH_3$ | 390 | 300 | 110 | 50 | 30 | 30 | 30 |

While we have fully described our invention in the foregoing specification and the claims which follow, it should be understood that the form and containerization of the catalyst, except for the physical separation of the catalysts, is not critical and variations thereof are within the skill of the art and are within the scope of our invention. More particularly, the pellets for each catalyst material may be placed in the same converter with a separator to prevent intermixing or they may be placed in separate converters; a monolith impregnated in separate zones with each of the catalyst materials may be used or separate monoliths in the same or separate converters may be used; or a combination of pellets and monoliths may be used. As used in the specification and claims "bed", "catalyst" and the like are intended to mean any such obvious variants.

What is claimed is:

1. A process for improved three-way stoichiometric type automotive emissions control comprising the steps of contacting the emissions stream with a first catalyst consisting of rhodium supported on a refractory substrate to effect the selective chemical reduction of nitric oxide to nitrogen, said rhodium being present in an amount of at least about 0.002% by weight of the catalyst, said emissions stream being then contacted with a second catalyst separated from said first catalyst and consisting of at least one of the noble metals selected from the group of platinum and palladium, said noble metal being present in a small but effective amount to accomplish the oxidation of the hydrocarbons and carbon monoxide left in said emissions stream, said process being accomplished without the addition of oxygen to said emissions stream.

2. A process for improved three-way control of an automotive exhaust stream having a composition which fluctuates from rich to lean about its stoichiometric composition comprising the steps of first contacting said exhaust stream with a catalyst consisting of rhodium supported on alumina to effect the chemical reduction of nitric oxide to nitrogen, said rhodium being present in an amount as small as about 0.002% by weight of the catalyst, then contacting said exhaust stream with a second catalyst to oxidize the hydrocarbons and carbon monoxide remaining in said exhaust stream, said second catalyst being separated from said first catalyst and consisting of at least one of the noble metals platinum and palladium supported on alumina in an amount of at least about 0.05% by weight of said catalyst, the addition of oxygen between said first and second catalyst being omitted.

3. A process in accordance with claim 2 wherein said rhodium catalyst is pre-treated by thermal aging in air for about 24 hours at a temperature of about 900° C to decrease the amount of ammonia formation during contact of the exhaust stream therewith.

4. The process of reducing the nitrogen oxide content of an automotive exhaust gas stream and oxidizing the carbon monoxide and hydrocarbons content thereof, without producing substantial quantities of ammonia, characterized by the step of passing the gas stream through a first bed having rhodium as the catalytically effective material and then, without the addition of oxygen, through a second bed having at least one of the nobel metals platinum and palladium as the predominant catalytically effective material, the amount of rhodium contacted by the gas stream in the first bed being about 4 to 10% by weight of the amount of platinum metal and about 10 to 25% by weight of palladium metal being contacted by the gas stream in the second bed.

* * * * *